United States Patent [19]

Whiteside et al.

[11] Patent Number: 4,527,888
[45] Date of Patent: Jul. 9, 1985

[54] EXPOSURE CONTROL SYSTEM FOR PHOTOGRAPHIC CAMERA APPARATUS

[75] Inventors: George D. Whiteside, Lexington; Laura E. Keith, Reading; Donato F. Pizzuti, Lynnfield, all of Mass.

[73] Assignee: Polaroid Corporation, Cambridge, Mass.

[21] Appl. No.: 573,020

[22] Filed: Jan. 23, 1984

[51] Int. Cl.³ .............................. G03B 3/10; G03B 9/14
[52] U.S. Cl. .................................. 354/400; 354/195.1
[58] Field of Search ............... 354/400, 401, 436, 448, 354/421, 195.1, 230

[56] References Cited

U.S. PATENT DOCUMENTS 3,942,183  3/1976  Whiteside ............................ 354/246
4,167,316  9/1979  Johnson et al. ...................... 354/401
4,192,587  3/1980  LaRocque et al. ................... 354/421
4,346,972  8/1982  Takahashi ............................ 354/400
4,360,258 11/1982  Hashimoto .......................... 354/400
4,456,360  6/1984  Tamura ............................. 354/195.1

Primary Examiner—A. A. Mathews
Attorney, Agent, or Firm—Edward S. Roman

[57] ABSTRACT

An exposure control system for a photographic camera apparatus includes a single latch mechanism for latching a shutter blade mechanism of the type which is resiliently biased to move toward its scene light admitting position from its scene light blocking position between photographic exposure cycles and for latching an automatically focused lens arrangement at its appropriate focal position during a photographic exposure cycle.

5 Claims, 5 Drawing Figures

EXPOSURE CONTROL SYSTEM FOR PHOTOGRAPHIC CAMERA APPARATUS

BACKGROUND OF THE INVENTION

1. Field of the Invention

This invention relates generally to an exposure control system for a photographic camera apparatus and, more particularly, to an exposure control system for a photographic carmera apparatus utilizing a single latch mechanism to latch up both an automatic lens focusing system and a shutter blade mechanism.

2. Description of the Prior Art

Photographic camera apparatus embodying shutter blade mechanisms of the scanning type as well as rotatable lens mechanisms which may be automatically focused in accordance with the determined camera-to-subject range are well known in the art as described in U.S. Pat. No. 4,192,587, entitled "Proportional Fill Flash", by A. LaRocque et al., issued Mar. 11, 1980, in common assignment herewith and now incorporated by reference herein. Such scanning shutter blade mechanisms are generally spring driven from a scene light blocking position toward a maximum aperture defining position and thereafter returned to the scene light blocking position by energization of a solenoid. Since continued energization of the solenoid to maintain the shutter blade mechanism in its scene light blocking position when the camera is not in use would result in premature failure of the battery, such systems are ordinarily provided with a shutter latch mechanism that operates to maintain the shutter blade mechanism in its scene light blocking position after the solenoid is deenergized. Such cameras also employ rotatable lens disks or the like which may be rotatably driven to the appropriate focal position whereupon the lens disk is latched in place for the duration of the exposure cycle. At the end of the exposure cycle, the lens disk may be unlatched and returned to its original position in readiness for the next succeeding exposure cycle. In order to latch the lens disk at its appropriate focal position during the exposure cycle, it has been necessary to provide a separate latching mechanism apart from the shutter blade latching mechanisms. Thus, the provision of dual latching mechanisms for both the shutter blade mechanism and the lens disk can result in an undue mechanical complexity and expense.

Therefore, it is a primary object of this invention to provide an exposure control system for photograhic camera apparatus in which the latching mechanisms for the shutter blade mechanism and an automatically focused lens system are integrated into a unified simple mechanism.

It is a further object of this invention to provide an exposure control system for a photographic camera apparatus in which a single latch mechanism operates to latch both an automatically focused lens system during the exposure cycle and the shutter blade mechanism at the end of the exposure cycle.

Other objects of the invention will be in part obvious and will in part appear hereinafter. The invention accordingly comprises a mechanism and system possessing the construction, combination of elements and arrangement of parts which are exemplified in the following detailed disclosure.

SUMMARY OF THE INVENTION

An exposure control system for a camera apparatus having means for defining a focal plane comprises a shutter blade mechanism together with means for mounting the shutter blade mechanism for displacement between at least one arrangement wherein it blocks scene light from reaching the focal plane and another arrangement wherein it defines a maximum size aperture. The blade mechanism operates to define a range of progressively increasing sized apertures for admitting scene light to the camera focal plane as it moves from its scene light blocking arrangement toward its maximum size aperture defining arrangement. The exposure control system also comprises an objective lens arrangement together with means for mounting at least part of the objective lens arrangement for displacement between a plurality of focal positions. The objective lens arrangement is adapted to focus an image of a subject located at a different distance from the camera within a given range of distances at the focal plane of the camera at each of its focal positions. Means are provided for latching a shutter blade mechanism and the objective lens arrangement so as to inhibit either displacement of the shutter blade mechanism or the objective lens arrangement. The latching means is displaceable between a first position wherein the latching means is engaged with the shutter blade mounting means so as to inhibit displacement of the shutter blade mechanism from the scene light blocking arrangement toward the other maximum size aperture defining arrangement and disengaged from the objective lens arrangement to permit displacement thereof and a second position wherein the latching means is disengaged from the shutter blade mounting means to permit displacement thereof and engaged to the objective lens arrangement to prevent displacement thereof. The latching means comprises a latch pawl disposed for rotation between said first and second positions together with drive means for rotatably driving the latch pawl between the first and second positions.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENT

Figure 1:
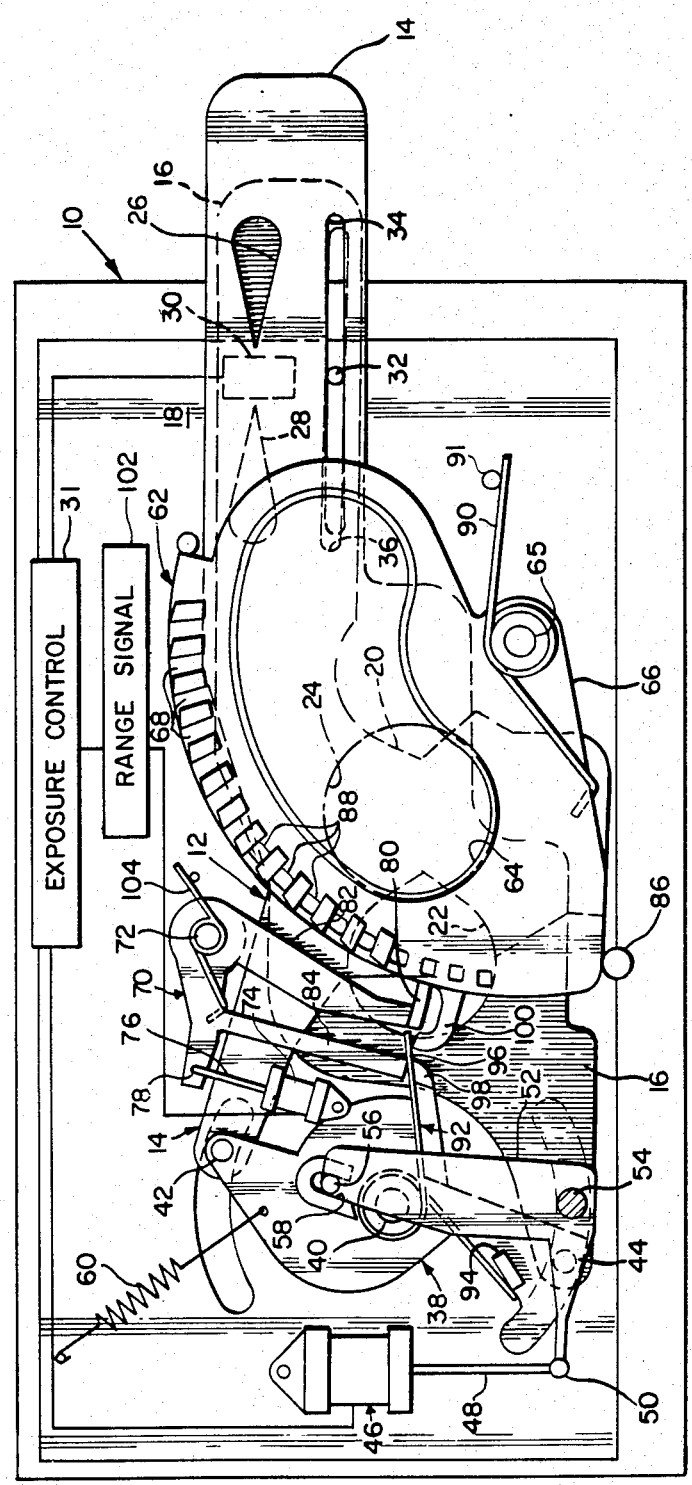
FIG. 1 is a front view of the exposure control system of this invention.

Referring now to FIG. 1, there is shown at 10 the photographic exposure control system of this invention comprising a scanning type shutter blade mechanism 12 having two overlapping shutter blade elements 14 and 16 disposed for reciprocal sliding movement with respect to each other on a baseblock casting 18. The shutter blade elements 14 and 16 are provided, respectively, with a portion of a scene light admitting primary aperture 20 and an entire scene light admitting primary aperture 22 to collectively define a progressive variation of effective aperture openings in accordance with simultaneous longitudinal and lateral displacement of one blade element with respect to the other blade element in a manner as is fully described in U.S. Pat. No. 3,942,183, entitled "Camera with Pivoting Blades", by George D. Whiteside, issued Mar. 2, 1976, in common assignment herewith and now incorporated by reference herein. Although as is readily apparent only a portion of the scene light admitting aperture 20 is actually cut into the blade 14, it will hereinafter be referred to simply as primary aperture 20. The primary apertures 20 and 22 are selectively shaped so as to overlap a light entry exposure opening 24 in the baseblock casting 18 thereby defining a varying effective aperture size as a function of the position of the blade elements 14 and 16.

Each of the blades 14 and 16 may additionally be configured to have corresponding photocell sweep secondary apertures shown, respectively, at 26 and 28. Secondary apertures 26 and 28 may be configured in correspondence with the shapes of scene light admitting primary apertures 20 and 22. As is readily apparent, the secondary apertures 26 and 28 also move in correspondence with the primary apertures 20 and 22 to define a small secondary aperture for admitting the passage of scene light from the scene being photographed to a scene light detecting station as shown generally at 30. The scene light detecting station 30 includes a photoresponsive element (not shown) which provides a signal to a light integrating circuit in an exposure control circuit as shown generally at 31 which operates in a manner as is fully described in U.S. Pat. No. 4,192,587, supra. Thus, the exposure interval can be terminated as a function of the amount of light received through the secondary effective aperture defined by the overlapping photocell sweep apertures 26 and 28 in a manner as is fully described in U.S. Pat. No. 4,192,587, supra.

Projecting from the baseblock casting 18 at a location spaced laterally apart from the light entry exposure opening 24 is a pivot pin or stud 32 which pivotally and translatably engages elongate slots 34 and 36 formed in respective shutter blade elements 14 and 16. Pin 32 may be integrally formed with the baseblock casting 18, and blade elements 14 and 16 may be retained in engaging relation with respect to the pin 32 by a suitable means such as peening over the outside end of the pin 32.

The opposite ends of the blade elements 14 and 16 respectively include extended portions which pivotally connect to a walking beam 38. The walking beam 38, in turn, is disposed for rotation relative to the baseblock casting 18 by pivotal connection to a projecting pivot pin or stud 40 which may also be integrally formed with the baseblock casting 18 at a location spaced laterally apart from the light entry exposure opening 24. The walking beam 38 may be pivotally retained with respect to the pin 40 by conventional means such as an E ring (not shown). In the preferred mode, the walking beam 38 is pivotally connected at its distal ends to the shutter blade elements 14 and 16 by respective pin members 42 and 44 which extend laterally outward from the walking beam 38.

Drive means are provided for displacing the blade mechanism and include a tractive electromagnetic device in the form of a solenoid 46 employed to displace the shutter blades 14 and 16 with respect to each other and the baseblock casting 18. The solenoid 46 includes an internally disposed cylindrical plunger 48 which retracts inwardly into the body of the solenoid upon energization of the solenoid winding. The outside end of the solenoid plunger 48 pivotally connects at 50 to a drive bell crank 52 which, in turn, is pivotally connected at 54 to a wall member (not shown) forward of the baseblock casting 18. The other side of the bell crank 52, in turn, includes an integral drive pin 56 extending laterally outward from the side thereof for sliding engagement in a slot or groove 58 integrally molded with respect to the walking beam 38. In this manner, the solenoid plunger 48 is connected to the walking beam 38 by way of the bell crank 52 so that vertical displacement of the plunger 48 will operate to rotate the walking beam 38 around the pivot pin 40 so as to appropriately displace the shutter blades 14 and 16.

Figure 5:
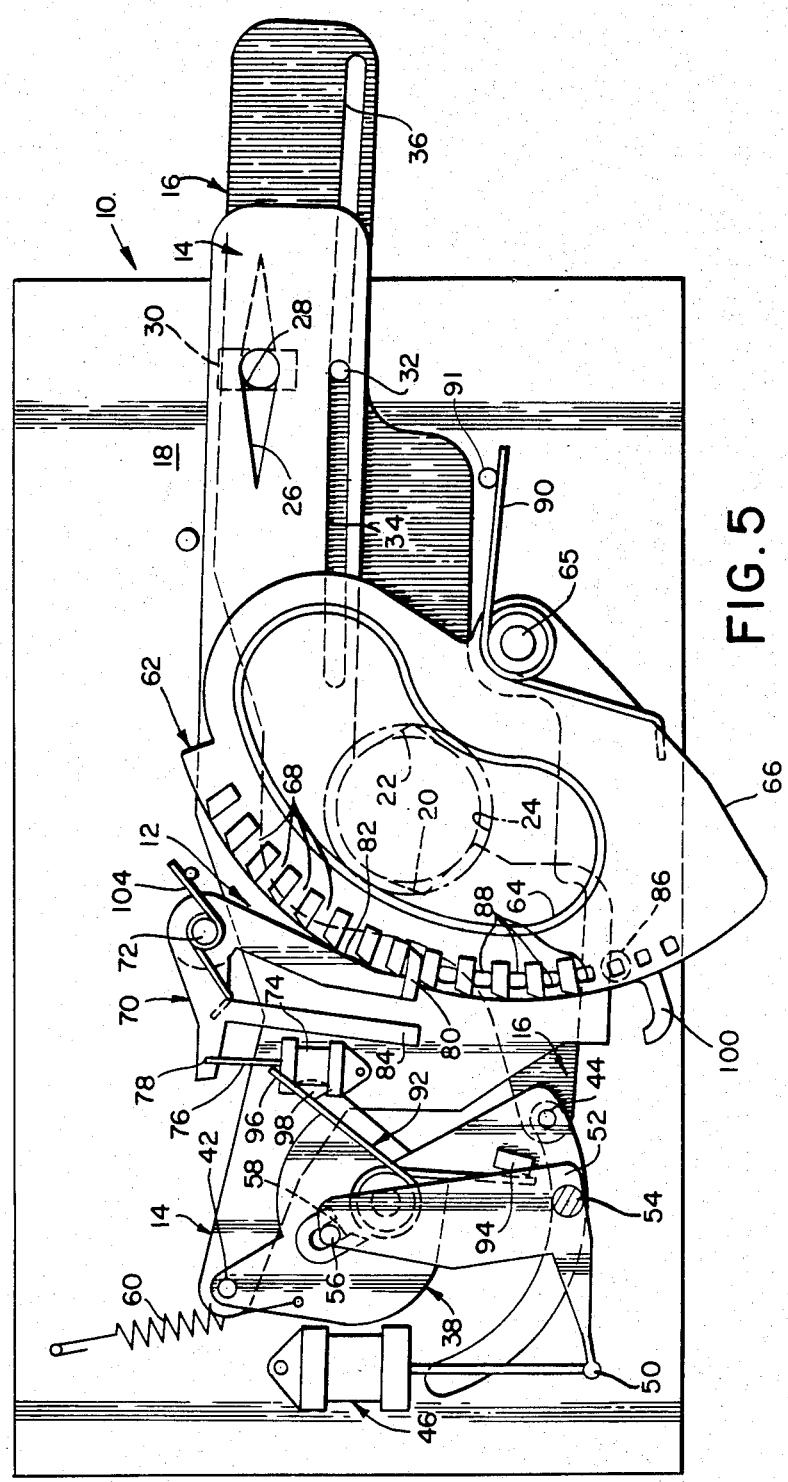
FIG. 5 is a front view of the exposure control system of FIG. 1 showing some components thereof in still another operative position.

This drive means may additionally include a tension spring 60 connected between the baseblock casting 18 and the walking beam 38 so as to continuously urge the walking beam 38 to rotate in a counterclockwise direction as viewed in FIG. 1 thereby also continuously urging the blade elements 14 and 16 into positions defining their largest effective aperture opening over the light entry exposure opening 24 as best seen in FIG. 5. As will be readily understood, in some shutter blade arrangements it may be preferable to utilize a compression spring in place of the tension spring 60 in a manner as is shown in U.S. Pat. No. 4,167,316, entitled "Sonar Controlled Lens Focus Apparatus", by Bruce K. Johnson et al., issued Sept. 11, 1979, in common assignment herewith and now incorporated by reference herein.

An objective lens assembly as shown generally at 62 preferably comprises a variable focus lens element 64 disposed within a holding member 66 for rotation about a pivot pin 65 fixedly connected with respect to the baseblock casting 18. As will be readily understood, the objective lens assembly 62 may comprise other lens elements (not shown) in fixed optical alignment with respect to the light entry exposure opening 24 and the variable focus lens element 64. The lens holding member 66 thus may be rotated between a plurality of focal positions wherein the objective lens assembly 62 is adapted to focus an image of a subject located at a different distance from the camera within a given range of distances at the focal plane (not shown) of the camera for each of its focal positions. The variable focus lens element 64 herein described is the invention of another and the subject of copending patent application Ser. No. 566,311, entitled "Analytic Function Optical Component", by J. Baker et al., filed Dec. 28, 1983 in common assignment herewith. As will be readily apparent, it may be replaced by a plurality of spaced apart discrete lens elements in a manner as is fully described in U.S. Pat. No. 4,167,316, supra. The lens holding member 66 includes a plurality of spaced apart integral slots or grooves 68 disposed about the periphery thereof which correspond to the number of different focal positions to which the lens assembly 62 may be set as will become apparent from the following discussion.

A latch pawl as shown generally at 70 is disposed for rotation with respect to the baseblock casting 18 by a pivot pin 72. Drive means are provided for displacing the latch pawl 70 and include another tractive electromagnetic device in the form of another solenoid 74 which also includes an internally disposed cylindrical plunger 76 which retracts inwardly into the body of the solenoid upon energization of the solenoid winding. The outer end of the plunger 76 pivotally connects at 78 to the latch pawl 70. The latch pawl 70 comprises a first integral elongated finger 82 extending outwardly from the pivot 72 to an integral latch tang 80 which may be slidably engaged within the grooves 68 in the manner of this invention to be subsequently described. The latch pawl 70 further comprises a resilient elongated integral second finger 84 which extends outwardly from the pivot 72 in generally parallel relationship with respect to the first finger 82 for engagement with the walking beam 38 also in the manner of this invention to be subsequently described herein.

A photocell and IRED as shown generally at 86 are spaced apart on opposite sides of the lens holding member 66 in optical registration with respect to each other along an axis normal to the plane of the drawing. The lens holding member 66 also includes a plurality of spaced apart apertures 88 disposed about the periphery thereof inside respective slots or grooves 68. Thus, counterclockwise rotation of the lens holding member 66 as viewed in FIG. 1 operates to drive the apertures 88 between the photocell and IRED 86 so as to enable the photocell to provide an output pulse count to the exposure control 31 indicative of the lens holding member 66 position. The lens holding member 66 is also resiliently biased to rotate in a clockwise direction as viewed from FIG. 1 by a biasing leaf spring 90 disposed about the pivot pin 65 with one end thereof resiliently engaged against a stop pin 91 from the baseblock casting 18.

Drive means are provided for rotating the lens holding member 66 in a counterclockwise direction against the resilient bias of the leaf spring 90 by a lens drive leaf spring 92 one end of which engages an integral stop member 94 from the walking beam 38 and the other end of which engages another integral stop member 98 from the walking beam 38. The outer end of the lens drive leaf spring 92 as shown at 96 is cantilevered beyond the stop 98 and operates to drive the lens holding member 66 by engaging an integral drive arm 100 extending radially outward from the lens holding member 66. The lens drive spring arrangement herein described is the invention of another, and although preferred it may nevertheless be replaced with a conventional lens drive arrangement as taught in U.S. Pat. No. 4,192,587.

Operation of the above-described exposure control system may commence in the usual manner upon the depression of an exposure cycle initiation button (not shown) as is fully described in U.S. Pat. No. 4,192,587, supra. The exposure control system 10 preferably comprises an automatic ranging system which provides a range signal corresponding to the camera-to-subject distance range. The automatic ranging system may be of the sonic type as is fully described in U.S. Pat. No. 4,192,587, supra, and thereby provide the range signal to a range signal circuit as shown generally at 102.

Figure 2:
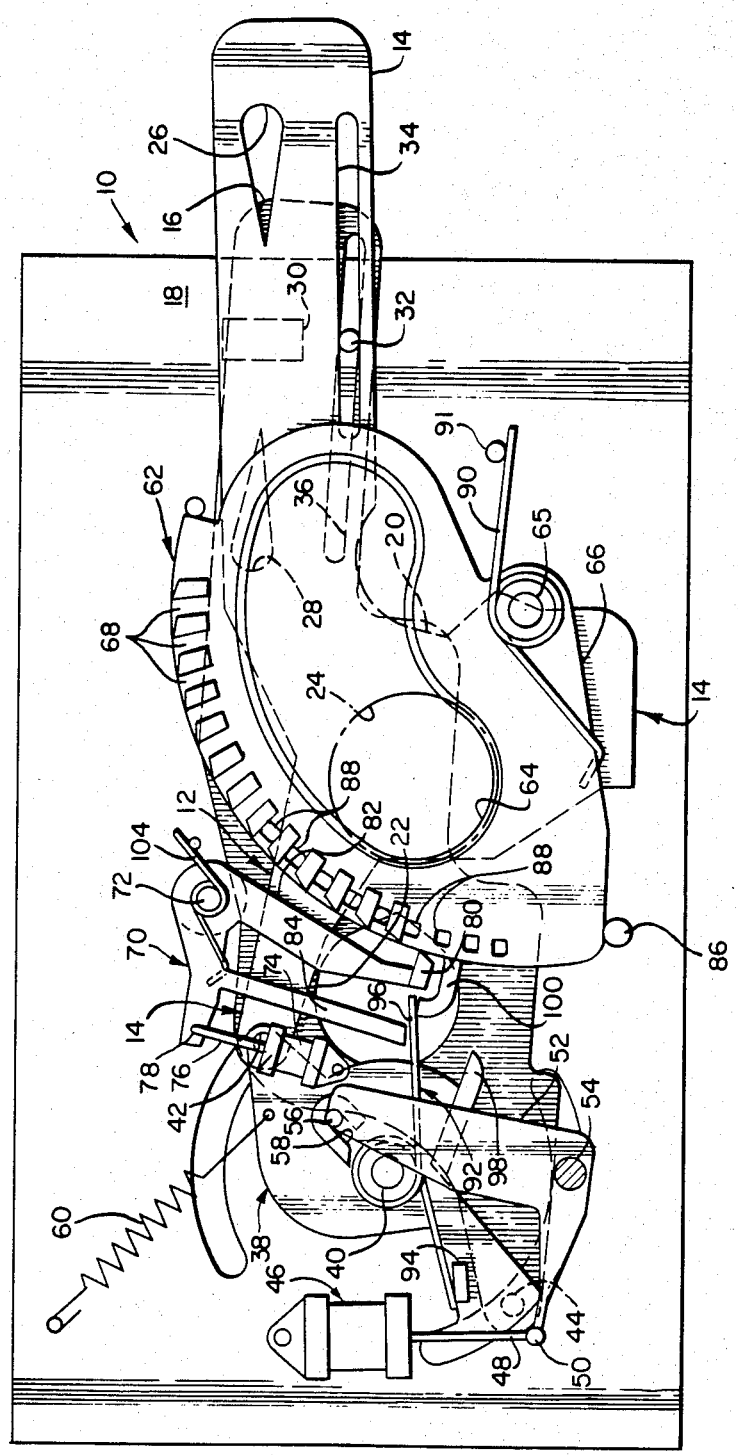
FIG. 2 is a front view of the exposure control system of FIG. 1 showing some components thereof in another operative position.
Figure 3:
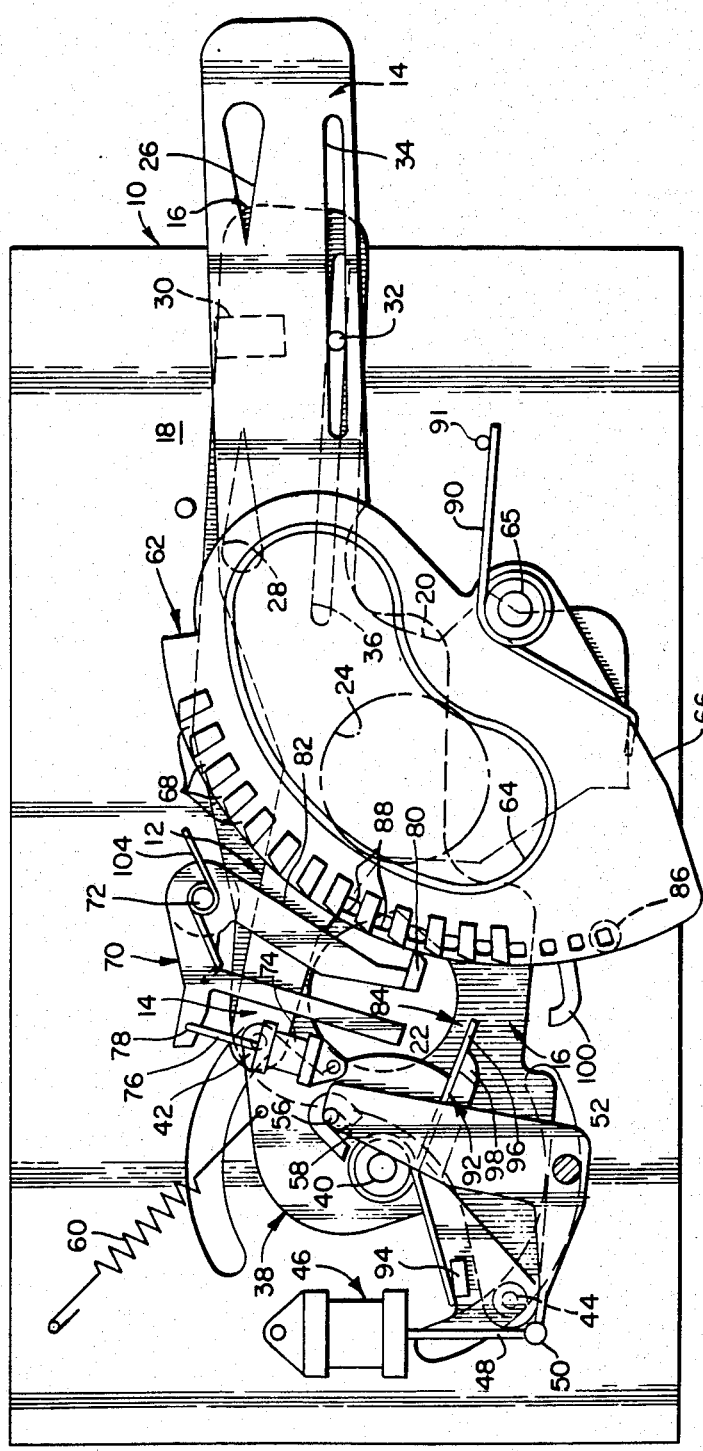
FIG. 3 is a front view of the exposure control system of FIG. 1 showing some components thereof in still another operative position.

After the operation of the automatic rangefinder and the provision of the range signal corresponding to the determined camera-to-subject distance range in the aforementioned manner, solenoid 46 is energized so as to retract the plunger 48 thereof inwardly into the solenoid winding and thereby rotate the bell crank 52 in a clockwise direction so as to simultaneously rotate the walking beam clockwise about its pivot 40 from its position as shown in FIG. 1 to its position as shown in FIG. 2. As is now readily apparent, this limited rotation of the walking beam 38 operates initially to further tension the lens drive spring 92 since the lens driving end 96 of the spring 92 cannot respond quickly enough to keep up with the stop member 98. After the walking beam 38 is driven to its position as shown in FIG. 2, the lens drive spring 92 unwinds so as to rotate the drive end 96 thereof in a clockwise direction from its position as shown in FIG. 2 to its position as shown in FIG. 3 thereby also simultaneously engaging the drive arm 100 so as to set the lens holding member 66 into counterclockwise rotation against the resilient bias of its return spring 90. Thus, the untensioning of the drive spring 92 operates to drive the lens holding member 66 and its associated variable focus lens element 64 through its plurality of focal positions.

Figure 4:
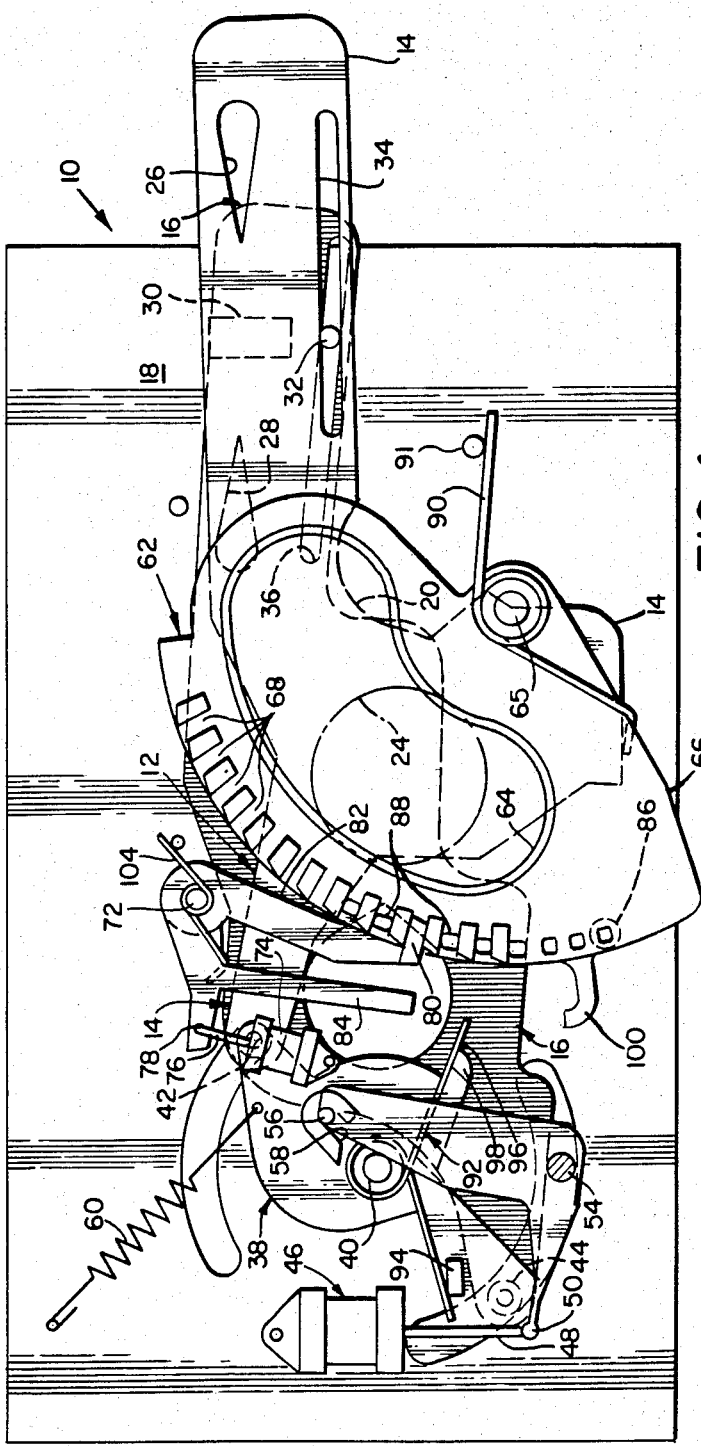
FIG. 4 is a front view of the exposure control system of FIG. 1 showing some components thereof in still another operative position.

When the output pulse count from the photocell-IRED 86 indicates that the lens element 64 has reached a focal position corresponding to the determined camera-to-subject distance as represented by the range signal, the circuit 102 operates to energize the solenoid 74 so as to retract the plunger 76 inwardly into the winding thereof. This, in turn, operates to rotate the latch pawl 70 in a counterclockwise direction about the pivot pin 72 so as to drive the latch tang 80 into the appropriate groove 68 and stop the rotation of the lens holding member 66 at the appropriate focal position corresponding to the previously determined camera-to-subject distance range. After the latch pawl 70 has been rotated into its lens latching position as shown in FIG. 4 in the aforementioned manner, the solenoid 46 is deenergized so as to allow the walking beam 38 to be rotated in a counterclockwise direction under the driving influence of tension spring 60 thereby driving the shutter blade elements 14 and 16 from their scene light blocking arrangement as shown in FIG. 4 toward their maximum aperture size defining position as shown at FIG. 5.

Upon the determination of the correct exposure by the scene light detecting station 30 and exposure control circuit 31 in a manner as is fully described in U.S. Pat. No. 4,192,587, supra, there is applied a control signal operative to energize the solenoid 46 and withdraw the plunger 48 therein so as to rotate the walking beam 38 in a clockwise direction from its scene light admitting position as shown in FIG. 5 back to its scene light blocking position as shown in FIG. 4. Upon the termination of the exposure cycle and the rotation of the walking beam 38 back to its scene light blocking position as shown in FIG. 4, there is provided a control signal operative to deenergize the solenoid 74 thereby allowing the latch pawl 70 to be rotated in a clockwise direction about its pivot pin 72 under the urging influence of a drive leaf spring 104 back to its original position as shown in FIG. 3. The lens holding member 66 is thereafter rotated back to its original position as shown in FIG. 2 under the driving influence of its return spring 90. A control signal is thereafter provided to deenergize the solenoid 46 so as to allow limited rotation of the walking beam 38 in a counterclockwise direction under the biasing influence of its drive spring 60 so as to drive the stop member 98 into engagement with the end of the elongated second finger 84 of the latch pawl 70. In this manner, the walking beam 38 is latched to a position as shown in FIG. 1 so as to be maintained in its scene light blocking arrangement indefinitely without continued energization of either solenoid 46 or 74.

Thus, as now readily apparent, the exposure control system of this invention would normally be utilized in cameras of the type that are battery powered. In such cameras the risk of a battery failure although slight is nevertheless a risk which must be accounted for. Of greatest concern is the situation where the battery might fail during some mid-cycle operation of the camera such as when the shutter blades 14, 16 are at some scene light admitting position between the terminal positions as shown at FIGS. 1 and 5 and the lens pawl 70 is actuated to engage the lens holding member 66 at its appropriate focal position. Under this condition, a battery failure would result in the deenergization of the solenoid 74 thereby resulting in the clockwise rotation of the lens pawl 70 about its pivot 72 under the driving influence of its biasing spring 104 back to its walking beam latching position as shown in FIGS. 1-3. Subsequent replacement of the failed battery operates to energize the solenoid 46 so as to drive the walking beam 38 back to its scene light blocking position as shown in FIGS. 1-4 resulting in the integral stop 98 of the walking beam 38 being driven past the elongated second finger 84 of the lens pawl 70. Toward this end, the elongated second finger 84 is designed to be resilient so as to easily flex toward the elongated first finger 82 and thereby facilitate easy passage of the stop member 98 of the walking beam 38 therepast.

In this manner there is provided a single lens pawl 70 for latching both the shutter blade mechanism and the objective lens arrangement so as to inhibit either displacement of the shutter blade mechanism or the objective lens arrangement. The lens pawl 70 is displaceable between a first position as shown in FIG. 1 wherein it is engaged with the walking beam 38 so as to inhibit displacement of the shutter blade mechanism from its scene light blocking arrangement as shown in FIG. 1 toward the maximum size aperture defining position as shown in FIG. 5 and simultaneously disengaged from the lens holding member 66 to permit displacement of the lens holding member and its associated variable lens element 64, and a second position wherein the lens pawl 70 is disengaged from the walking beam 38 to permit the displacement of the shutter blade mechanism and simultaneously engaged to the lens holding member 66 to prevent its displacement.

Other embodiments of the invention including additions, subtractions, deletions, and other modifications of the preferred disclosed embodiments of the invention will be obvious to those skilled in the art and are within the scope of the following claims.

What is claimed is:

1. An exposure control system for a camera apparatus having means for defining a focal plane comprising:
    a shutter blade mechanism;
    means for mounting said blade mechanism for displacement between at least one arrangement wherein it blocks scene light from reaching the focal plane and another arrangement wherein it defines a maximum size aperture, said blade mechanism serving to define a range of progressively increasing sized apertures for admitting scene light to the camera focal plane as it moves from its said scene light blocking arrangement toward its maximum size aperture defining arrangement;
    an objective lens arrangement;
    means for mounting at least part of said objective lens arrangement for displacement between a plurality of focal positions, said objective lens arrangement being adapted to focus an image of a subject located at a different distance from said camera within a given range of distances at the focal plane of said camera at each of its said focal positions; and
    means for latching said shutter blade mechanism and said objective lens arrangement so as to inhibit either displacement of said shutter blade mechanism or said objective lens arrangement, said latching means being displaceable between a first position wherein said latching means is engaged with said shutter blade mounting means so as to inhibit displacement of said shutter blade mechanism from said one scene light blocking arrangement toward said other maximum size aperture defining arrangement and disengaged from said objective lens arrangement to permit the displacement thereof, and a second position wherein said latching means is disengaged from said shutter blade mounting means to permit the displacement thereof and engaged to said objective lens arrangement to prevent the displacement thereof.

2. The camera apparatus of claim 1 wherein said latching means comprises a latch pawl disposed for rotation between said first and second positions and drive means for rotatably driving said latch pawl between said first and second positions.

3. The camera apparatus of claim 2 wherein: said shutter blade mounting means comprises a shutter blade connecting member disposed for rotation in one direction from a first position in which said blade mechanism defines said scene light blocking arrangement to a second position in which said blade mechanism defines said maximum size aperture; said latch pawl operates when in its said first position to engage said blade connecting member so as to inhibit rotation of said blade connecting member from its said first position in its said one direction while permitting rotation of said blade connecting member from its said first position in the opposite direction to its said one direction of rotation; and rotation of said blade connecting member from its said first position in the opposite direction to said one direction of rotation operates to displace said objective lens arrangement between its said plurality of focal positions.

4. The camera of claim 3 wherein a portion of said latch pawl is resiliently yieldable so as to allow rotation of said blade connecting member in its said opposite direction from its said second position back to its said first position when said latch pawl is in its said first position.

5. The camera of claim 4 wherein said resilient portion of said latch pawl comprises an elongated first finger, said elongated first finger extending in integral fixed parallel spaced apart connection with respect to a substantially rigid elongated second finger which engages said objective lens arrangement when said latch pawl is in its said second position.

* * * * *